United States Patent [19]

Ono

[11] Patent Number: 4,850,465
[45] Date of Patent: Jul. 25, 1989

[54] TEMPERATURE-SENSITIVE FLUID TYPE FAN COUPLING APPARATUS

[75] Inventor: Yuichi Ono, Numazu, Japan

[73] Assignee: Usui Kokusai Sangyo Kabushiki Kaisha, Shizuoka, Japan

[21] Appl. No.: 122,936

[22] Filed: Nov. 19, 1987

[30] Foreign Application Priority Data

Nov. 21, 1986 [JP] Japan .................. 61-277910

[51] Int. Cl.⁴ .................. F16D 35/00; F16D 43/25
[52] U.S. Cl. .................. 192/58 B; 192/82 T
[58] Field of Search .................. 192/58 B, 82 T; 123/41.12

[56] References Cited

U.S. PATENT DOCUMENTS

| | | | |
|---|---|---|---|
| 2,879,755 | 3/1959 | Weir | 192/82 T X |
| 2,988,188 | 6/1961 | Tauschek | 192/58 B X |
| 3,217,849 | 11/1965 | Weir | 192/82 T |
| 3,259,221 | 7/1966 | Godfrey | 192/58 B |
| 3,272,188 | 9/1966 | Sabat | 192/58 B X |
| 3,430,743 | 3/1969 | Fujita et al. | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/58 B |
| 4,403,684 | 9/1983 | Haeck | 192/58 B |
| 4,505,367 | 3/1985 | Martin | 192/58 B |
| 4,685,549 | 8/1987 | Brunken et al. | 192/58 B |
| 4,699,258 | 10/1987 | Johnston et al. | 192/58 B |

FOREIGN PATENT DOCUMENTS

| | | |
|---|---|---|
| 1158769 | 12/1963 | Fed. Rep. of Germany . |
| 2453006 | 5/1975 | Fed. Rep. of Germany . |
| 7834288 | 9/1983 | Fed. Rep. of Germany . |
| 55-76226 | 6/1980 | Japan .................. 192/58 B |

Primary Examiner—Leslie A. Braun
Assistant Examiner—Richard M. Lorence
Attorney, Agent, or Firm—Anthony J. Casella; Gerald E. Hespos

[57] ABSTRACT

A temperature-sensitive fan-coupling apparatus is provided with a driving side and a driven side. The driving side comprises a tightly sealed housing. The driven side comprises a rotary member from which fan blades extend. The rotary member includes a following disc disposed in the housing with a torque transmission gap existing between the following disc and the housing. A partition plate is mounted to the rotary member to define an oil reservoir therebetween. An aperture extends through the partition plate to provide communication between the oil reservoir and the torque transmission gap. A temperature-sensitive member is mounted external to the driven end of the apparatus and to one end of a connecting rod which extends through the rotary member and into the oil reservoir. A valve member is mounted to the end of the connecting rod in the oil reservoir and is disposed to selectively cover or open the hole in the partition plate to control the flow of fluid between the oil reservoir and the torque transmission gap. Movement of the valve member is controlled by the temperature-sensitive member.

7 Claims, 4 Drawing Sheets

TEMPERATURE-SENSITIVE FLUID TYPE FAN COUPLING APPARATUS

BACKGROUND OF THE INVENTION

1. Field of the Invention

This invention relates to a temperature-sensitive fluid type fan coupling apparatus which, in an automobile engine, for example, enables the rotation of a cooling fan to be controlled in compliance with change of temperature in the neighborhood of the engine thereby incessantly effecting automatic regulation of the volume of cooling air supplied to the engine in compliance with the travelling condition of the automobile.

2. Description of the Prior Art

The conventional fluid type fan coupling apparatus of the kind under discussion, as illustrated in FIG. 2, comprises a rotary shaft member (21) made of an iron material as a driving side component, a tightly sealed housing (22) supported as a following side component through the medium of a bearing (24) on the rotary shaft member (21) and provided on the external part thereof with a cooling fan. A partition plate (30) having of an oil flow adjusting hole (32) is adapted to divide the interior of the tightly sealed housing into an oil reservoir (31) and a torque transmission chamber (27). A driving disc (28) is disposed in the torque transmission chamber (27) and secured at the leading end of the rotary shaft member (21) in a state retaining a torque transmission gap (27') in conjunction with the opposed inner peripheral surface of the tightly sealed housing (22). A valve member (34) is disposed inside the oil reservoir (31) and adapted to open and close the flow adjusting hole (32) in compliance with the change of shape which a temperature-sensitive member (33) disposed on the front side of the tightly sealed housing (22) undergoes owing to the change of temperature of the ambience thereof. A dam (35) and an oil circulation route (36) are both disposed in part of the inner peripheral surface of the tightly sealed housing (22) opposed to the outer peripheral surface of the driving disc (28) destined to collect oil thereon during the rotation thereof, which circulation route (36) is connected to the dam (35) and adapted to start from the torque transmission gap (27') and terminate in the oil reservoir (31) side.

In the conventional fan coupling apparatus constructed as described above, however, since the tightly sealed housing (22) having the cooling fan attached thereto is formed as a following side component, molded inevitably in the form of a thick-walled cast part of aluminum alloy material contrary to the demand for products of reduced weight, and fabricated as provided on the outer surface thereof with a multiplicity of radially disposed upright radiation fins, it generally assumes an increased weight, adds to the inertial moment exerted to the apparatus, inevitably necessitates use of a large bearing on account of an increase in the load exerted on the bearing (24), and rather tends to increase the overall weight of the apparatus as a finished product. Further, the heat generated by the shear of oil in the torque transmission gap (27') is conducted to the tightly sealed housing (22) made of an aluminum alloy of high thermal conductivity and consequently deforms the fitting part of resin on the fan side. Moreover, since the temperature-sensitive member (33) is directly attached to the front side of the tightly sealed housing (22) made of an aluminum alloy in close proximity to the oil reservoir (31) and, consequently, the course for heat conduction is short, the temperature-sensitive member (33) is susceptible of the influence of the propagation of heat through the oil inside the oil reservoir and liable to induce errors in the change of shape due to change of temperature in the ambience and admit hysteresis in the control characteristics.

SUMMARY OF THE INVENTION

An object of this invention is to provide a temperaturesensitive fluid type fan coupling apparatus which has very effectively solved the aforementioned problem raised by the prior art. Since a tightly sealed housing made of an aluminum alloy material is directly secured on the driving side and, at the same time, a rotary member made of an iron material as a driven side component and provided with a cooling fan is supported through the medium of a bearing on a shaft core opening formed in the front side wall of the tightly sealed housing, there is derived the advantage of lessing the load exerted on the following side provided with the cooling fan, decreasing the inertial moment, and permitting use of a miniature bearing. Further the cooling effect is notably enhanced by the fact that the state of high-speed rotation is generated on the tightly sealed housing. The anxiety about possible adverse effect of heat upon the cooling fan and a temperature-sensitive member is eliminated, the use of a one-piece fan made of a resinous material is rendered possible, and the impairment of control characteristics due to possible generation of heat during a protracted use of the engine is perfectly prevented because the rotary member can be disposed as separated from an oil reservoir and, as the result, the length of a route for heat conduction is allowed to be increased and also because the rotary member is made of an iron material of low heat conductivity.

This invention concerns a fluid type fan coupling apparatus adapted to effect control of the transmission of rotation from the driving side to the driven side by increasing or decreasing the available area of contact of oil in a torque transmission gap between the driving side and the driven side in compliance with change of temperature in the ambience. Essentially this fluid type fan coupling apparatus is constructed by rotatably disposing a tightly sealed housing composed of a case and a case cover, causing a temperature-sensitive member to be supported on the front side through the medium of a bearing in a shaft core opening on the case cover side and a shaft core base of a rotary member provided as a driven side component with a cooling fan to be supported externally in the shaft core opening, securing a following disc on the rear terminal part of the rotary member positioned inside the tightly sealed housing thereby permitting retention of a torque transmission gap between the external periphery of the following disc and the opposed internal peripheral surface of the tightly sealed housing, dividing a circular depression on the rear side of the following disc with a partition plate thereby giving rise to an oil reservoir and a torque transmission chamber communicating with the aforementioned torque transmission gap, providing the partition plate with an oil flow adjusting hole serving to establish communication between the oil reservoir and the torque transmission chamber, disposing inside the oil reservoir a valve member adapted to open and close the flow adjusting hole in cooperation with a connected rod moved in compliance with the change of shape of the temperature-sensitive member, disposing on part of the outer peripheral surface of the following disc destined to collect oil during rotation thereof a dam projected on the opposed internal peripheral surface of the tightly sealed housing, and disposing in the proximity of the dam and in front of the direction of rotation thereof an oil circulation route pierced in the radial direction through the following disc and allowed to establish communication between the torque transmission gap and the oil reservoir.

The other features and advantages of the present invention will be understood when the following description of an exemplary embodiment is read in conjunction with the figures of the accompanying drawings.

BRIEF DESCRIPTION OF THE DRAWINGS

With Reference to FIG. 1 through FIG. 3, (1) denotes a rotary drive member, such as a pulley, which is provided at the leading end thereof with a tightly sealed housing (2) composed of a case (2') and a case cover (2''), made of an aluminum alloy material, intended as a driving side component, and disposed either integrally or separately on the case (2') side and (5) denotes a rotary member which is made of an iron material and has a shaft core base thereof supported through the medium of a bearing (4) of an iron material in a shaft core opening (3) on the case cover (2'') side. The rotary member (5), by having a temperature-sensitive member (13 or 13') such as of bimetal, for example, attached to the front side thereof and a cooling fan (6) attached on the outer side thereof, completes a driven side. Denoted by (8) is a following disc secured on the rear terminal part of the rotary member (5) positioned inside the tightly sealed housing (2). This following disc (8) is adapted to retain a torque transmission gap (7') between the external periphery thereof and the opposed inner peripheral surface on the tightly sealed housing (2) side.

Figure 1:
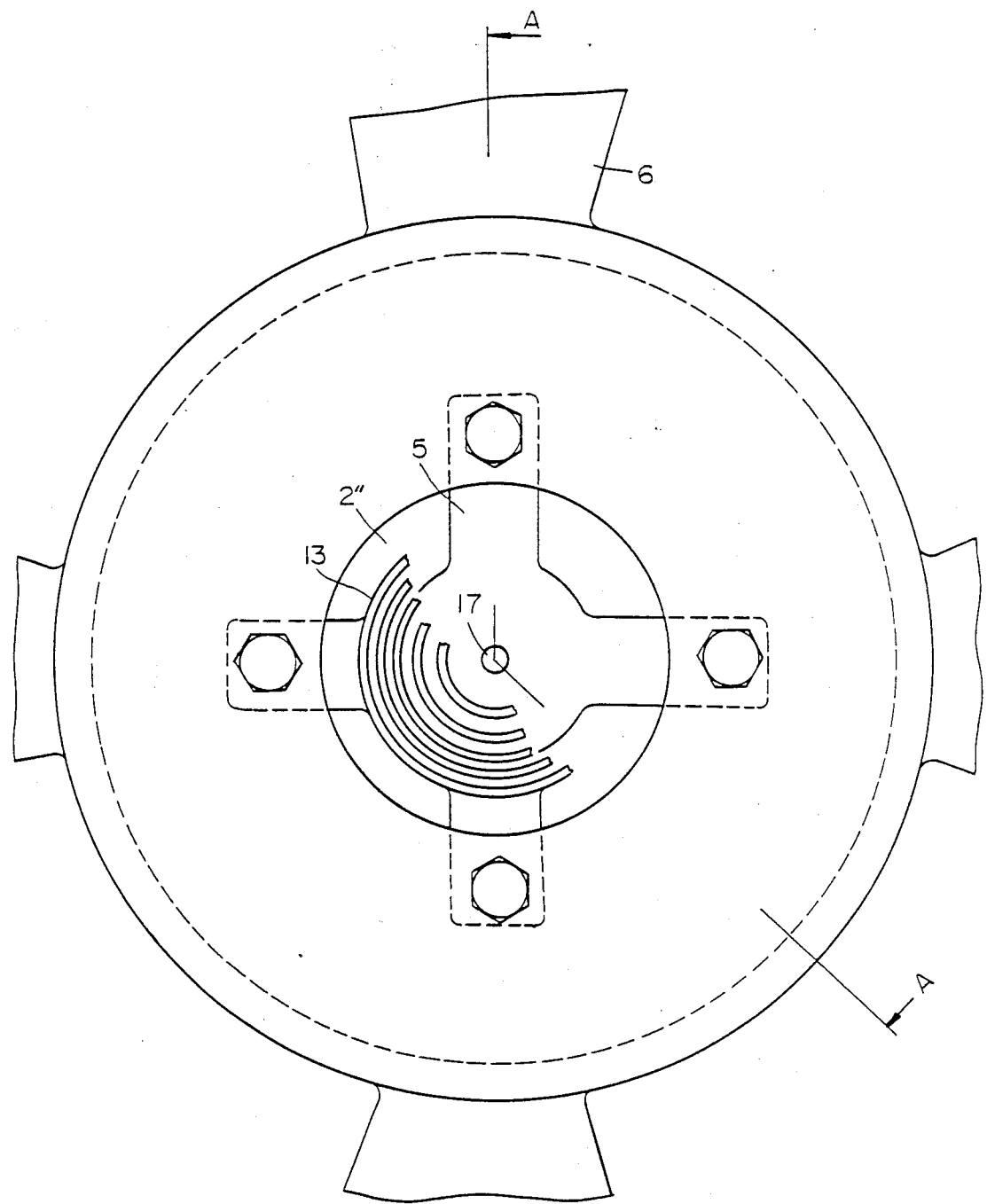
FIG. 1 is a front view of a typical temperature-sensitive flow type fan coupling appartus as one embodiment of the present invention.
Figure 2:
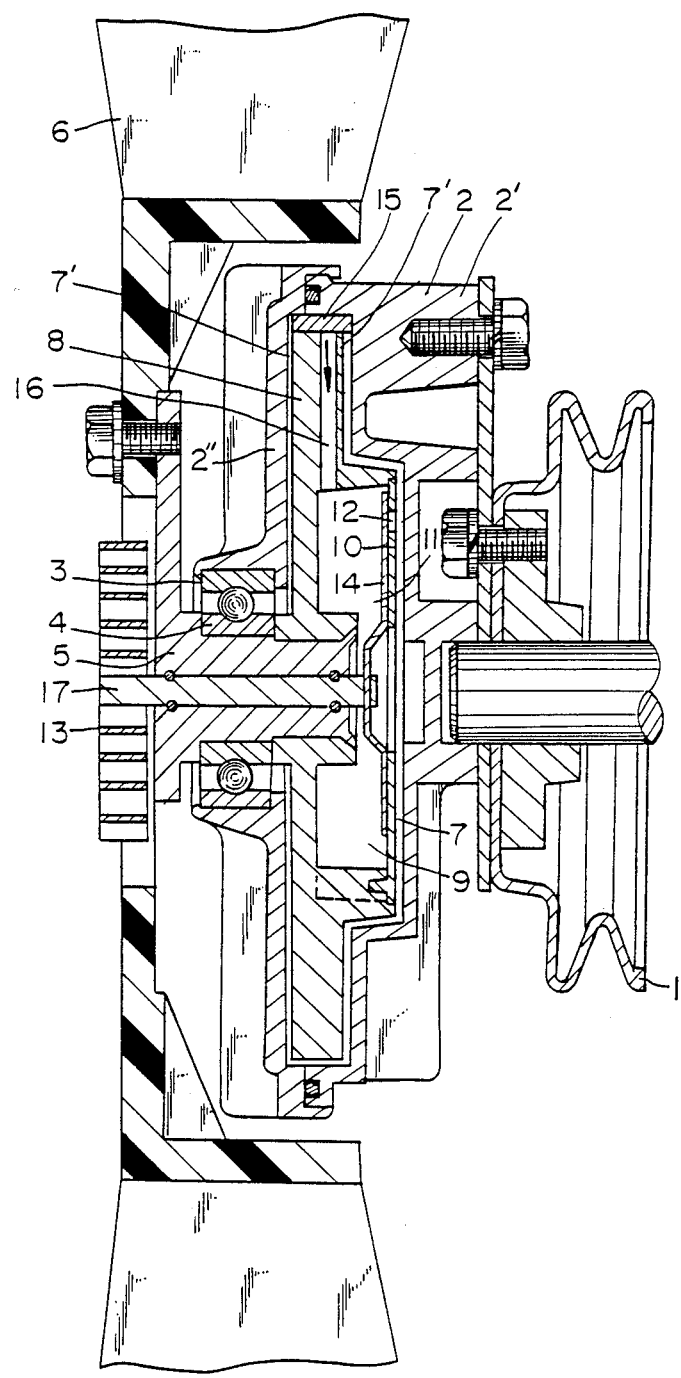
FIG. 2 is a cross section taken through FIG. 1 along the line A—A.

By (10) is denoted a partition plate which divides a circular depression (9) around the central part on the rear side of the following disc (8) and gives rise to an oil reservoir (11) and a torque transmission chamber (7) communicating with the torque transmission gap (7'). This partition plate (10) is provided with a flow adjusting hole (12) adapted to establish communication from the oil reservoir (11) to the torque transmission chamber (7). Then, (14) denotes a valve member disposed inside the oil reservoir (11). This valve member (14) is adapted to open and close the flow adjusting hole (12) on the partition plate (10) side in cooperation with a connecting rod (17) disposed as pierced through the shaft core part of the rotary member (5) and allowed to move by following the change of shape caused in the temperaturesensitive member (13 or 13') by the change of temperature in the ambience. By (15) is denoted a dam which is disposed on part of the outer peripheral surface of the following disc 8) destined to collect oil during the rotation thereof as projected on the opposed inner peripheral side of the tightly sealed housing (2). Denoted by (16) is an oil circulation route disposed in the proximity of the dam (15) in front of the direction of rotation thereof in such a manner as to penetrate in the radial direction through the following disc (8) and establish communication from the torque transmission gap (7') to the oil reservoir (11).

Figure 3:
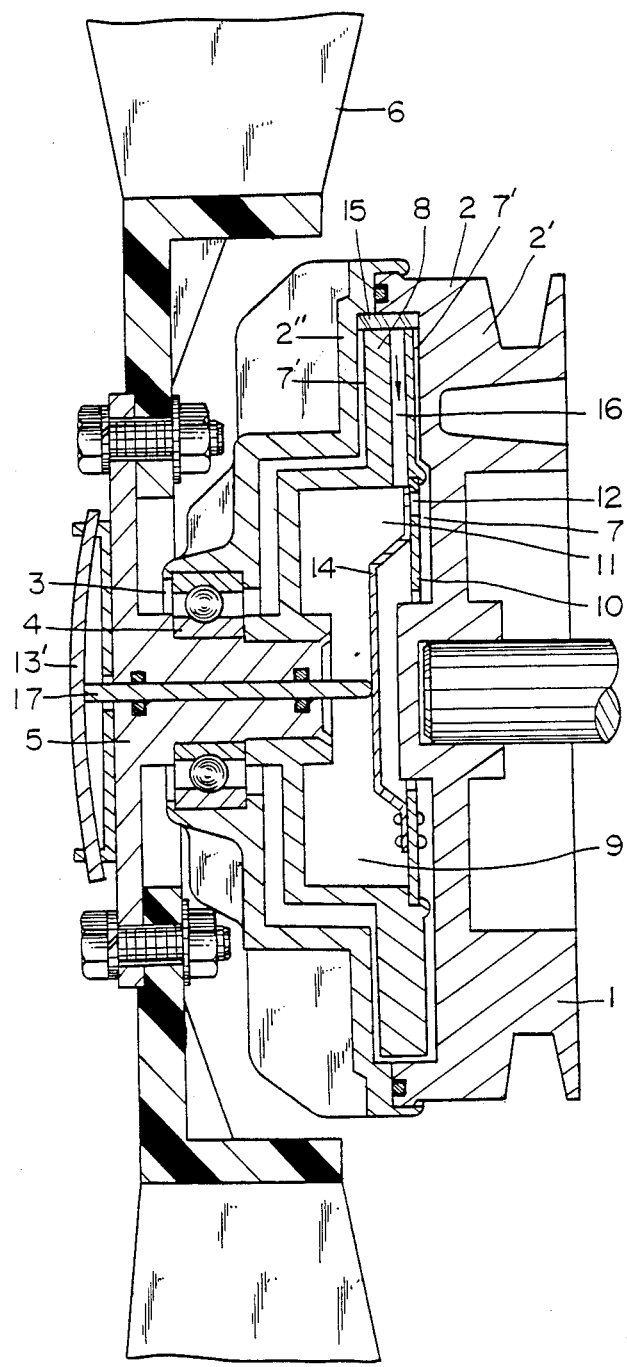
FIG. 3 is a diagram illustrating another embodiment of the present invention similarly to FIG. 2.
Figure 4:
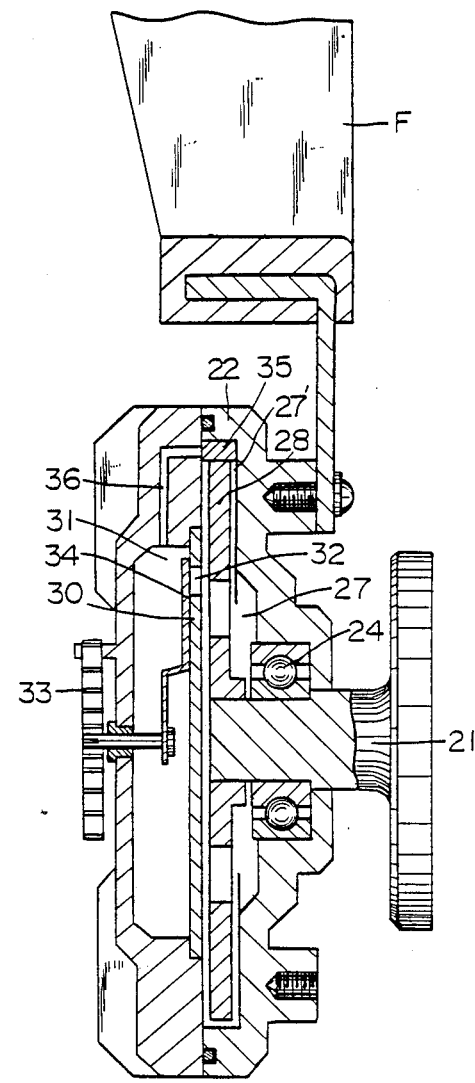
FIG. 4 is a longitudinal cross section of a conventional countertype apparatus.

The temperture-sensitive member (13) is spirally shaped (FIG. 1) so that the valve member (14) will be opened or closed laterally in a sliding motion relative to the flow adjusting hole (12) in compliance with the change of shape taking place rotationally in the circumferential direction depending on the change of temperature in the ambience. It is otherwise shaped like a flat rectangular plate (13' as shown in FIG. 3) so that the valve member (14) will be opened or closed in a longitudinal motion.

In the present invention which is constructed as described above, the following side is formed with an extremely small weight because the tightly sealed housing (2) is adapted to be driven rotationally and the rotary member (5) fitted as a driven side component with the cooling fan is supported through the medium of the bearing (4) in the shaft core opening (3) on the front side wall [case cover (2'')] on the tightly sealed housing side and, at the same time, even the following disc (8) is disposed on the following side. The cooling effect of the tightly sealed housing itself is notably enhanced owing to the state of highspeed rotation produced in the tightly sealed housing (2) which is intended as a driving side component. The anxiety about possible exertion of the influence of heat upon the fan and the temperature-sensitive member is eliminated even when the tightly sealed housing (2) is suffered to generate heat because the cooling fan (6) and the temperature-sensitive member (13) are fixed through the medium of the bearing (4) and the rotary member (5) both made of an iron member of low thermal conductivity.

As described above, the temperature-sensitive flow fluid type fan-coupling apparatus of the present invention is allowed to reduce the weight of the following side, decrease the inertial moment, lighten the load exerted on the bearing (4) serving the purpose of supporting the following side, lengthen the service life of the apparatus itself, and permit use of a miniature bearing because the tightly sealed housing (2) is adapted to be driven rotationally and the following disc (8) is disposed on the following side; permit use of a one-piece fan made of a resinous material because the cooling effect in the tightly sealed housing (2) in itself is notably enhanced, the route of heat conduction is given an increased length, and the bearing (4) and the rotary member (5) are both made of an iron material of low thermal conductivity; manifest the control characteristics with high speed of response in following the incessant change of temperature even during a protracted service of the apparatus without any anxiety about the influence of the heat possibly generated inside the tightly sealed housing (2) because the temperaturesensitive member (13) is attached to the rotary member made of an iron material of low thermal conductivity; and enjoy efficient economization of power consumption and effective abatement of the noise of fan. Thus, the apparatus proves to be highly useful.

Thus, there is provided in accordance with the present invention a temperature-sensitive flow fluid type fan-coupling apparatus which has the advantage discussed above. The embodiment described is intended to be purely illustrative, not limitative, of the invention. Persons of ordinary skill in the art, therefore, are enabled to make variations and modifications thereof without departing from the spirit and scope of the invention. All such modifications are embraced in the scope of the claims appended hereto.

What is claimed is:

1. A temperature-sensitive fluid-type fan coupling apparatus having a rotational axis, a driving side component disposed generally at one end of the rotational axis and a driven side component disposed generally at the opposed axial end of said rotational axis, said driving side component comprising a directly rotationally driven tightly sealed housing comprising a housing body and a housing cover and defining an interior therebetween, the interior of said housing defining an inner peripheral surface, a shaft core opening extending generally axially into the housing cover from the portion thereof adjacent the driven side component; said driven side component comprising a generally axially aligned rotary member having one end rotatably mounted in the shaft core opening of the housing, said rotary member having a cooling fan attached to a portion thereof external to said housing, a following disc securely mounted on the rotary member and disposed in the interior of said housing, said following disc comprising a depression extending into an axial end thereof facing away from the shaft core opening, said following disc being disposed in spaced relationship to the housing such that a torque transmission gap exists between the following disc and the inner peripheral surface of said housing interior, an oil circulation route extending in a radial direction through the following disc and extending between the depression therein and a radially outward portion of the torque transmission gap; a partition plate secured to the following disc and substantially covering the depression therein such that said depression defines an oil reservoir, said partition plate separating said oil reservoir from a torque transmission chamber communicating with said torque transmission gap, the partition plate being provided with an oil flow adjusting hole for providing communication between the oil reservoir and the torque transmission chamber; a valve member mounted inside said oil reservoir adjacent the partition plate and being movable relative thereto to selectively open or close the oil flow adjusting hole therein; a temperature-sensitive member secured to a portion of the rotary member external of said housing, a portion of said temperature-sensitive member being movable relative to said rotary member in response to changes in ambient temperature external of said housing; actuation means operatively connecting the movable portion of said temperature-sensitive member and said valve member for moving said valve member in response to changes in temperature sensed by said temperature-sensitive member, whereby the temperature-sensitive member is spaced from said oil reservoir thereby minimizing transfer of heat from oil in the oil reservoir to said temperaturesensitive member.

2. The apparatus according to claim 1, wherein said temperature-sensitive member is a spiral bimetal adapted to open and close said oil flow adjusting hole by causing said valve member to be slid relative to said flow adjusting hole about the rotational axis.

3. The apparatus according to claim 1, wherein said temperature-sensitive member is a flat rectangular bimetal adapted to open and close said oil flow adjusting hole by causing said valve member to be moved axially relative to said flow adjusting hole.

4. The apparatus according to claim 1, wherein said tightly sealed housing is made of an aluminum alloy material.

5. The apparatus according to claim 8, comprising a bearing interposed between said shaft core opening of said housing cover and said rotary member, said bearing being made of an iron material.

6. The apparatus according to claim 1, wherein said rotary member is made of an iron material.

7. The apparatus according to claim 1, wherein said cooling fan is a onepiece article made of a resinous material.

* * * * *